Figure 1:
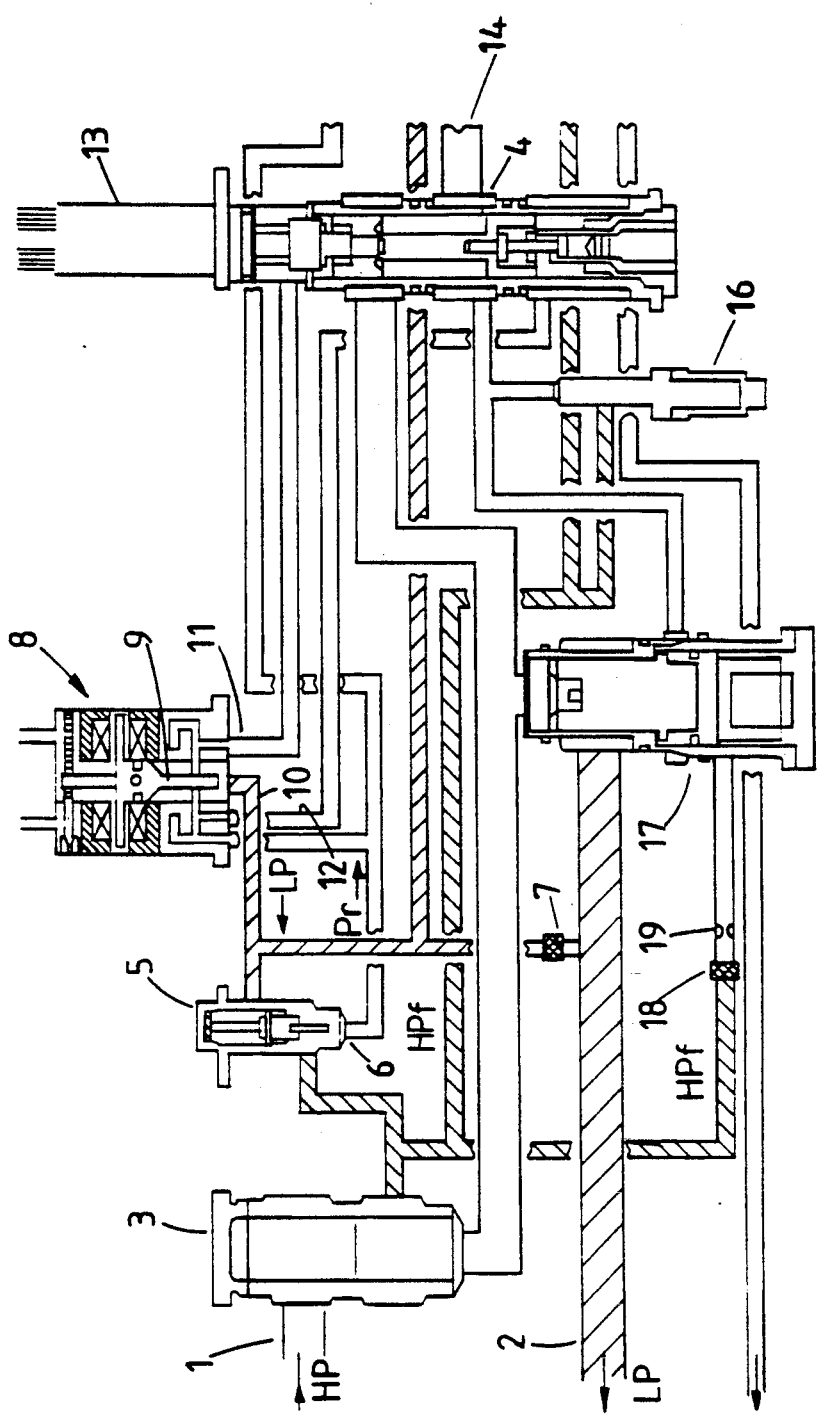

United States Patent [19]

Smith

[11] Patent Number: 5,315,818

[45] Date of Patent: May 31, 1994

[54] FUEL CONTROL SYSTEM

[75] Inventor: Trevor S. Smith, West Midlands, England

[73] Assignee: Lucas Industries public limited company, Solihull, England

[21] Appl. No.: 13,463

[22] Filed: Feb. 4, 1993

[30] Foreign Application Priority Data

Feb. 21, 1992 [GB] United Kingdom ............... 9203770

[51] Int. Cl.⁵ ..................... F02C 7/232; F02C 9/26
[52] U.S. Cl. ..................... 60/39.281; 60/734
[58] Field of Search ............... 60/39.094, 39.281, 734

[56] References Cited

U.S. PATENT DOCUMENTS

| | | | |
|---|---|---|---|
| 4,760,662 | 8/1988 | Dyer et al. | 60/39.281 |
| 4,760,696 | 8/1988 | Rooks et al. | 60/39.281 |
| 4,794,755 | 1/1989 | Hutto et al. | 60/39.281 |
| 4,817,376 | 4/1989 | Brocard et al. | 60/39.281 |
| 5,020,315 | 6/1991 | Leachman | 60/39.281 |

Primary Examiner—Louis J. Casaregola
Attorney, Agent, or Firm—Jenner & Block

[57] ABSTRACT

The fuel control system supplies an engine via a pressure raising and shut-off valve. The valve is operated by a piston and cylinder arrangement. A shut-off motor controls the fuel pressure in a control line of a rapid shut-down valve. The rapid shut-down valve is operable to connect the cylinder to a high pressure fuel supply (HPf) via relatively large diameter pipes. The shut-off motor also controls the fuel pressure in a second control line connected directly to the cylinder. The shut-off motor is operable to supply high pressure fuel to the cylinder via the second control line. The rate of fuel flow into the cylinder via the second control line is less than that via the rapid shut-down valve so as to provide a normal rate of shut-down.

13 Claims, 2 Drawing Sheets

FUEL CONTROL SYSTEM

The present invention relates to a fuel control system. Such a system may be used to control the supply of fuel to the burners of a gas turbine, for instance for aerospace applications.

Known fuel control systems are disclosed in U.S. Pat. No. 4,300,347, U.S. Pat. No. 4,715,397, U.S. Pat. No. 4,493,187, and EP 0 388046.

According to the invention, there is provided a fuel control system comprising: a first cylinder and a first piston; a first valve body movable between a first position for preventing fuel flow and a second position for permitting fuel flow, the first valve body being connected to the first piston; biasing means for biasing the first valve body towards the first position; and valve means for selectively connecting the first cylinder to a first source of fuel arranged to supply fuel at a first pressure and at a first rate of flow, to a second source of fuel arranged to supply fuel at a second pressure and at a second rate of flow which is lower than the first rate, or to a third source of fuel at a third pressure which is less than the first and second pressures. The third source of fuel may comprise a fuel sink.

The first and second pressures may be equal to each other.

The biasing means may comprise resilient biasing means, such as a spring.

The valve means may comprise a second valve body movable between a first position for connecting the first cylinder to the first fuel source and a second position for disconnecting the first cylinder from the first fuel source, a second cylinder connected to a controllable pressure fuel source, and a second piston located within the second cylinder and connected to the second valve body for movement therewith. The controllable pressure fuel source may comprise a first variable orifice connected to the second cylinder and via a first flow restrictor to a high pressure connection. The first variable orifice may comprise a first fixed orifice cooperating with a closure element for providing variable venting of fuel from the first fixed orifice. The second fuel source may comprise a second variable orifice connected to the first cylinder and via a second flow restrictor to a high pressure connection. The second variable orifice may comprise a second fixed orifice cooperating with the closure element for providing variable venting of fuel from the second fixed orifice. The closure element may be connected to an actuator, such as a torque motor. The actuator may have a first stable state in which the first fixed orifice and the second fixed orifice are vented, a second stable state in which the first fixed orifice is closed and the second fixed orifice is vented, and a third stable state in which the first fixed orifice is vented and the second fixed orifice is closed.

Figure 2:
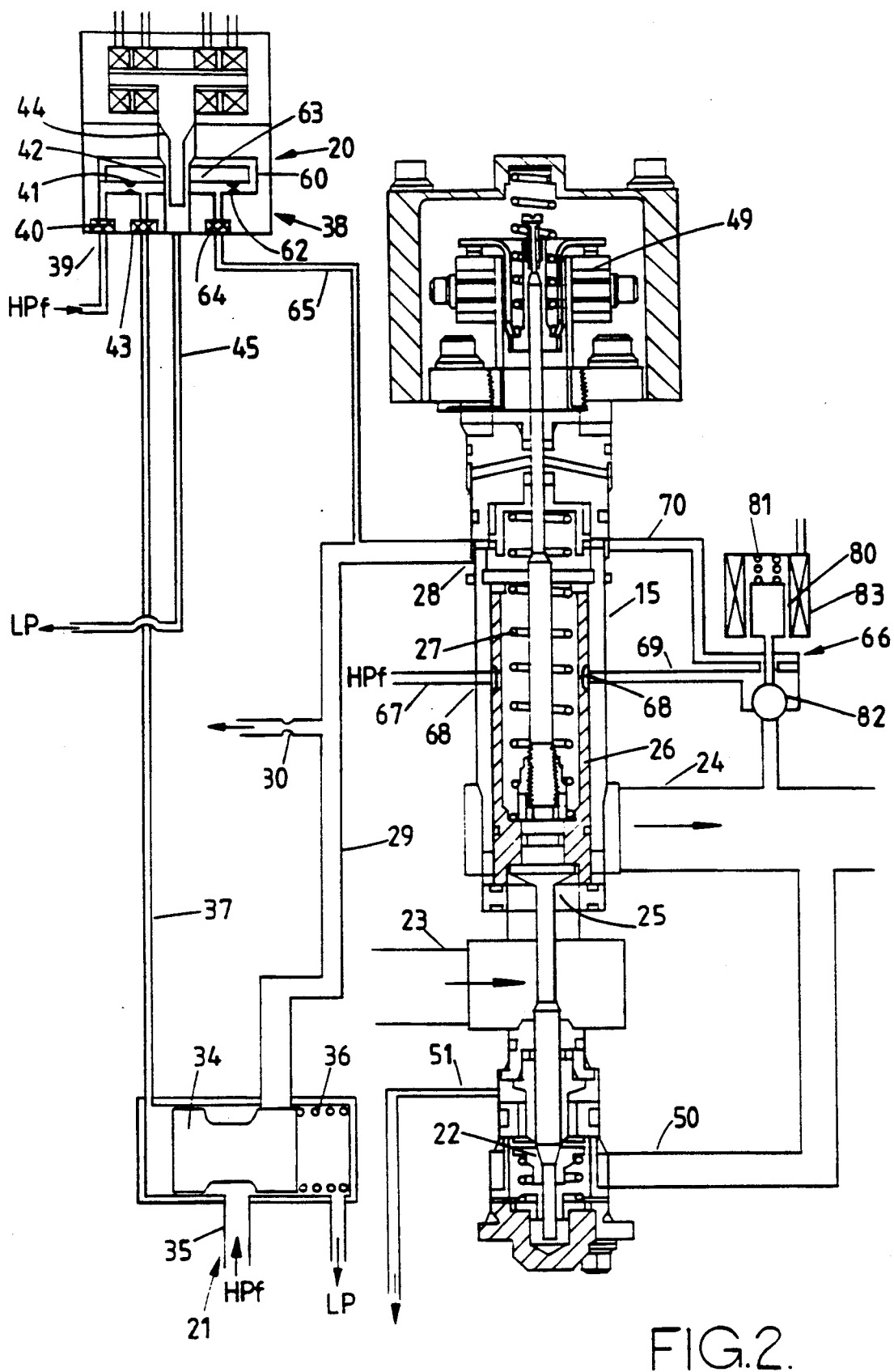

The invention will be further described, by way of example, with reference to the accompanying drawings, in which:

FIGS. 1 and 2 are schematic cross-sectional diagrams of first and second parts, respectively, of a fuel control system constituting an embodiment of the invention.

The fuel control system receives high pressure fuel at an inlet 1 from a fuel pump (not shown) and returns low pressure fuel to the inlet of the pump from an outlet 2.

The high pressure fuel passes directly through a flow wash filter 3 to the inlet of a metering valve 4, which controls the rate of flow of fuel. Filtered fuel (HPf) from the filter 3 is supplied to a servo-pressure regulator 5, which provides at its outlet 6 fuel at a constant regulated pressure (Pr). Excess fuel is vented from the regulator 5 via a filter 7 to the low pressure fuel outlet 2, the filter 7 serving to remove contaminants when the fuel system is initially charged and fuel may flow in the reverse direction through the filter 7. The regulator 5 establishes the constant regulated pressure with respect to the low pressure fuel (LP).

A fuel flow control actuator 8 comprising a valve arrangement controlled by a main torque motor receives the constant regulated pressure fuel and controls the position of a metering body with respect to a metering orifice in the metering valve 4. The torque motor comprises a plurality of windings which control the torque applied to an armature 9. The armature 9 acts between two orifices so as to control their degree of venting to a low pressure outlet 10 and hence the differential fuel pressure in outlets 11 and 12. The outlets 11 and 12 are connected to control inlets of the metering valve 4 so as to control the position of the metering valve body with respect to the metering orifice. In particular, the differential pressure causes the metering body to move towards the side of lower pressure, thus altering the uncovered area of the metering orifice. The position of the metering body is converted into a corresponding electrical signal by a transducer 13 comprising a linear variable differential transformer, whose output is used by an electronic controller (not shown) to form a feedback servo-control loop for the rate of fuel supply. The main outlet 14 of the metering valve 4 is connected to a pressure raising and shut-off valve 15 shown in FIG. 2.

Filtered high pressure fuel is supplied to a low flow adjuster 16, which is connected to the metering valve 4 and to a pressure drop and spill valve 17. The low flow adjuster 16 permits calibration of low fuel flow rates of the metering valve 4.

The high pressure filtered fuel is supplied via a filter 18 and a restrictor 19 to an inlet of the pressure drop and spill valve 17, which is connected to the low pressure fuel outlet 2. The pressure drop and spill valve 17 provides a constant pressure drop across the metering orifice of the metering valve 4, so that fuel flow rate is controlled by the position of the metering valve body and is substantially independent of fluctuations in the flow rate of the high pressure fuel at the inlet 1. Excess fuel is spilled by the valve 17 to the inlet of the fuel pump via the outlet 2.

The pressure raising and shut-off valve 15 is associated with a shut-off torque motor 20, a rapid shut-down valve 21, and a dump valve 22, all of which are shown in FIG. 2. The pressure raising and shut-off valve 15 has an inlet 23 for receiving a metered fuel flow from the metering valve 4. The valve 15 has an outlet 24 for supplying the metered fuel flow to an engine manifold for the burners of a gas turbine engine, for instance for use in an aircraft. A valve 25 is arranged between the inlet 23 and the outlet 24 and comprises a movable valve body 26 urged in a closing direction by preloading provided by a compression helical spring 27. The interior of the valve body 26 acts as a piston within a cylinder having an inlet/outlet 28. Thus, until the pressure of fuel in the inlet 23 exceeds this preloading, the valve 15 prevents the supply of fuel to the engine manifold. Once the pressure of the high pressure fuel exceeds this preloading, the valve 25 opens to permit the flow of fuel to the engine manifold.

The inlet/outlet 28 is connected via a pipe 29 to the outlet of the rapid shut-down valve 21 and via a flow restrictor 30 to a pump unloading valve. The valve 21 has a valve body 34 which is movable between first and second positions for connecting and disconnecting, respectively, the inlet/outlet 28 to the high pressure filtered fuel supplied from the filter 3 via an inlet 35.

The valve body 34 is biased by a compression helical spring 36 so as to prevent the flow of high pressure filtered fuel through the valve 21. The valve body 34 acts as a piston within a cylinder which is connected via a pipe 37 to the output of a valve arrangement 38 controlled by the torque motor 20. The valve arrangement comprises an inlet 39 which receives high pressure filtered fuel and supplies this via a filter 40 and a restrictor 41 to an orifice 42 and, via a filter 43, to an outlet connected to the pipe 37. The inlet 39 also supplies high pressure fuel via a line 60 and a restrictor 62 to an orifice 63 and, via a filter 64, to an outlet which is connected via a pipe 65 to the inlet/outlet 28.

The motor 20 comprises a center stable torque motor having four coils for controlling movement of an armature 44 between three positions. In the first position, the armature 44 vents fuel from the orifices 42 and 63 to an outlet 45 and thence to the low pressure fuel outlet 2. In the second position, the armature 44 closes the orifice 42 and vents fuel from the orifice 63 to the outlet 45. In the third position, the armature 44 vents fuel from the orifice 42 to the outlet 45 and closes the orifice 63. Thus the position of the armature 44 controls the pressure within the pipes 37 and 65.

The pressure raising and shut-off valve 15 is provided at one end with micro-switches 49 for signalling to the electronic controller the operating state of the valve 15. At the other end, the dump valve 22 is actuated by the valve body 26 and has an inlet 50 connected to the outlet 24 and an outlet 51 connected to a drain tank. When the pressure raising and shut-off valve 15 is closed to prevent the flow of fuel to the engine manifold, the dump valve 22 is opened so as to vent fuel from the manifold to the drain tank. When the valve 15 is open, the dump valve 22 is closed.

A start up solenoid valve 66 is connected between a line 69, the outlet 24 of the valve 15, and the inlet/outlet 28 of valve 15 via a line 70. An armature 80 is biased by a spring 81 to hold a valve member 82 such that the connection to the outlet 24 from the start up solenoid valve 66 is closed and lines 69 and 70 are in fluid communication.

Coils 83 of the start up solenoid valve 66 can be energized to move the armature 80 against the action of the spring 81 closing the path between the line 69 and the line 70. The ports 68 are uncovered when the valve 15 is in the shut position, thereby allowing fluid pressure communication between a high pressure fuel line 67 and the line 69. The ports 68 are covered when the valve 15 is in the normal operating position, i.e. when the valve 15 is open.

During normal operation, for instance of an aero-engine, the motor 20 is in its first position so that both the orifices 42 and 63 are open. Fuel in the pipe 37 is vented via the orifice 42 to the outlet 45 so that the valve body 34 is urged by the spring 36 to the left in FIG. 2. The rapid shut-down valve 21 is thus closed and prevents the supply of high pressure filtered fuel to the pipe 29. Fuel in the pipe 29 is vented via the pipe 65 and the orifice 63 to the outlet 45. The pressure raising and shut-off valve 15 is open for as long as the pressure of the high pressure fuel supplied by the metering valve 4 is greater than the minimum permissible value defined by the preloading provided by the spring 27. The low pressure applied via the restrictor 30 keeps the pump unloading valve closed so as not to affect operation of the fuel pump.

When it is desired to effect a rapid shut-down of the engine, the motor 20 is actuated so that the armature 44 moves to its second position. The orifice 63 remains open but the orifice 42 is closed, thus applying high pressure to the rapid shut-down valve 21 via the pipe 37. The valve body 34 moves rightwardly in FIG. 2 against the action of the spring 36 to supply a rapid flow of high pressure fuel from the inlet 35 via the pipe 29 to the inlet/outlet. The high pressure is supplied via the restrictor 30 so as to open the pump unloading valve which causes excess fuel from the pump outlet to spill to the pump inlet.

The inlet/outlet 28 and the ducts now connecting it to the high pressure filtered fuel are of relatively large bore whereas the pipe 65 is of relatively narrow bore, so that high pressure fuel is supplied at a high rate to the inside of the valve body 26. The valve 25 thus closes rapidly to prevent the flow of fuel to the engine manifold. The dump valve 22 opens so as to vent fuel in the outlet 24 and the manifold to the drain tank. It is therefore possible to provide a very rapid shut-down of the engine, for instance in response to an engine overspeed detection signal from a suitable transducer.

When the pressure raising and shut-off valve 15 is shut, high pressure fuel is fed via the ports 68, the line 67, the start up solenoid valve 66 and the line 70 to the inlet/outlet 28, thereby holding valve 15 shut. The torque motor 20 can be returned to the first position, the armature 44 moving so that the orifices 42 and 63 vent to the outlet 45. Pressure in pipe 37 thus falls and the valve body 34 moves under the action of spring 36 to remove the supply of high pressure filtered fuel to the pipe 29 via the rapid shut-down valve 21. The pressure raising and shut-off valve 15 remains shut as high pressure fuel is still supplied to the inlet/outlet 28 via the start up solenoid valve 66.

In order to open valve 15, the start up solenoid valve 66 is energized, thereby removing the supply of high pressure fuel to the inlet/outlet 28. The reduced pressure via the restrictor 30 closes the pump unloading valve. The valve 25 opens once the pressure at the inlet 23 is sufficiently great to move the valve body 26.

When it is desired to effect a normal shut-down of the engine, the torque motor 20 moves the armature to the third position so that the orifice 63 is closed. The inlet/outlet 28 is now connected via the relatively small bore pipe 65 to the high pressure filtered fuel so that the pressure raising and shut-off valve 15 closes relatively slowly. Thus, potential engine damage and potential pressure surge with subsequent damage to low pressure fuel pipes etc., caused by rapid reduction in fuel flow when the rapid shut-down valve 21 operates, can be prevented during normal engine operation. Subsequent movement of the armature 44 to the first position uncovers the orifice 63 to allow the pressure to be vented via the pipe 65 and the orifice 63 to the outlet 45. However, valve 15 remains closed due to the latching action via ports 68 and solenoid valve 66 as previously described.

A further advantage is that, in the event of a dry-lift start, air vapor in the pipes can be pumped out of the system by a gear pump via the line 67, the ports 68 and the solenoid valve, at low pressure and without the need to open the valve 25. Once all the air vapor is vented and fuel starts to flow, the valve 25 will open, shutting off the ports 68 and hence the leakage path from the line 67.

I claim:

1. A fuel control system, comprising:
   a first cylinder and a first piston within said cylinder and a combined inlet/outlet for providing fluid communication with a variable volume enclosed by said first piston and said first cylinder;
   a shut-off valve having an inlet, an outlet, and a first valve body movable between a first position for preventing fuel flow to said outlet and a second position for permitting fuel flow to said outlet said first valve body being connected to said first piston;
   biasing means for biasing said first valve body towards the first position; and
   valve means for selectively connecting said combined inlet/outlet to one of a first source of fuel arranged to supply fuel at a first pressure and at first rate of flow, a second source of fuel arranged to supply fuel at a second pressure and at a second rate of flow which is lower than the first rate of flow, and a fuel sink at a third pressure which is less than the first and second pressures.

2. A fuel control system as claimed in claim 1, in which said valve means comprises a second valve body movable between a first position for connecting said first cylinder to said first source of fuel and a second position for disconnecting said first cylinder from said first source of fuel, a second cylinder, a second piston, and a controllable pressure fuel source, said second cylinder being connected to said controllable pressure fuel source and said second piston being located within said second cylinder and connected to said second valve body for movement therewith.

3. A fuel control system as claimed in claim 2, in which said controllable pressure fuel source comprises a first variable orifice and a first, flow restrictor, said first variable orifice being connected to said second cylinder and via said first flow restrictor to a high pressure connection.

4. A fuel control system as claimed in claim 3, in which said first variable orifice comprises a first fixed orifice and a closure element, said first fixed orifice cooperating with said closure element for providing variable venting of fuel from said fixed orifice.

5. A fuel control system as claimed in claim 1, in which said second fuel source comprises a variable orifice and a flow restrictor, said variable orifice being connected to said first cylinder and via said flow restrictor to a high pressure connection.

6. A fuel control system as claimed in claim 4, in which said second fuel source comprises a second variable orifice and a second flow restrictor, said second variable orifice being connected to said first cylinder and via said second flow restrictor to said high pressure connection.

7. A fuel control system as claimed in claim 6, in which said second variable orifice comprises a second fixed orifice cooperating with said closure element for providing variable venting of fuel from said second fixed orifice.

8. A fuel control system as claimed in claim 7, further comprising an actuator, said closure element being connected to said actuator.

9. A fuel control system as claimed in claim 8, in which said actuator is a torque motor.

10. A fuel control system as claimed in claim 8, in which said actuator has a first stable state in which said first and second fixed orifices are open, a second stable state in which said first fixed orifice is closed and said second fixed orifice is open, and a third stable state in which said first fixed orifice is open and said second fixed orifice is closed.

11. A fuel control, system as claimed in claim 1, in which the first pressure is equal to the second pressure.

12. A fuel control system as claimed in claim 1, in which said biasing means comprises a spring.

13. A fuel control system as claimed in claim 1, further comprising a full path for supplying fuel at a high pressure to said first cylinder when said first valve body is at the first position and removing means for selectively removing the supply of fuel at high pressure from said first cylinder.

* * * * *